United States Patent
Griffin

(10) Patent No.: US 11,012,295 B2
(45) Date of Patent: May 18, 2021

(54) PROVISIONING USING COMPUTER VISION

(71) Applicant: Oracle International Corporation, Redwood Shores, CA (US)

(72) Inventor: Kyle Griffin, Hermosa Beach, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 16/527,921

(22) Filed: Jul. 31, 2019

(65) Prior Publication Data

US 2021/0036917 A1 Feb. 4, 2021

(51) Int. Cl.
*G06F 15/177* (2006.01)
*H04L 12/24* (2006.01)
*G06T 7/50* (2017.01)
*G06T 1/00* (2006.01)

(52) U.S. Cl.
CPC ........ *H04L 41/0806* (2013.01); *G06T 1/0007* (2013.01); *G06T 1/0014* (2013.01); *G06T 7/50* (2017.01); *H04L 41/22* (2013.01)

(58) Field of Classification Search
CPC .... G06F 8/60; G06K 9/00476; G06K 9/4604; G06K 9/6253; G06K 9/6256; H04L 41/0806
See application file for complete search history.

(56) References Cited

U.S. PATENT DOCUMENTS

| | | | | |
|---|---|---|---|---|
| 2017/0060368 A1* | 3/2017 | Kochura | ............... | G06F 8/38 |
| 2017/0286799 A1* | 10/2017 | Gujar | ............... | G06K 9/4671 |
| 2018/0083887 A1 | 3/2018 | Monda et al. | | |
| 2018/0373961 A1* | 12/2018 | Wang | ............... | H04L 41/145 |
| 2019/0188185 A1 | 6/2019 | Lichtenberg et al. | | |

OTHER PUBLICATIONS

Turnbull, "The Terraform Book", Jul. 15, 2019, Version V1.5.0 (faad024), Chapter 3.
International Search Report and Written Opinion issued in the corresponding International Application No. PCT/US2020/035882, dated Sep. 18, 2020.

* cited by examiner

*Primary Examiner* — Brian Whipple
*Assistant Examiner* — Gregory P Tolchinsky
(74) *Attorney, Agent, or Firm* — Potomac Law Group, PLLC

(57) ABSTRACT

The embodiments of the present disclosure are generally directed to systems and methods for provisioning computing resources using computer vision. An image comprising a plurality of visual elements can be received. The visual elements within the image can be recognized as objects that represent network elements, where the recognized objects represent network elements of a network element type and the network element types comprise one or more of a database, a load balancer, a sub-network, or a virtual machine instance, and an arrangement of the recognized objects that represents a network architecture is recognized. Computing resources can be caused to be provisioned corresponding to the recognized objects by provisioning network elements that comprise one or more of the network element types, wherein the provisioning comprises generating a network architecture for the provisioned network elements based on the recognized arrangement.

19 Claims, 18 Drawing Sheets

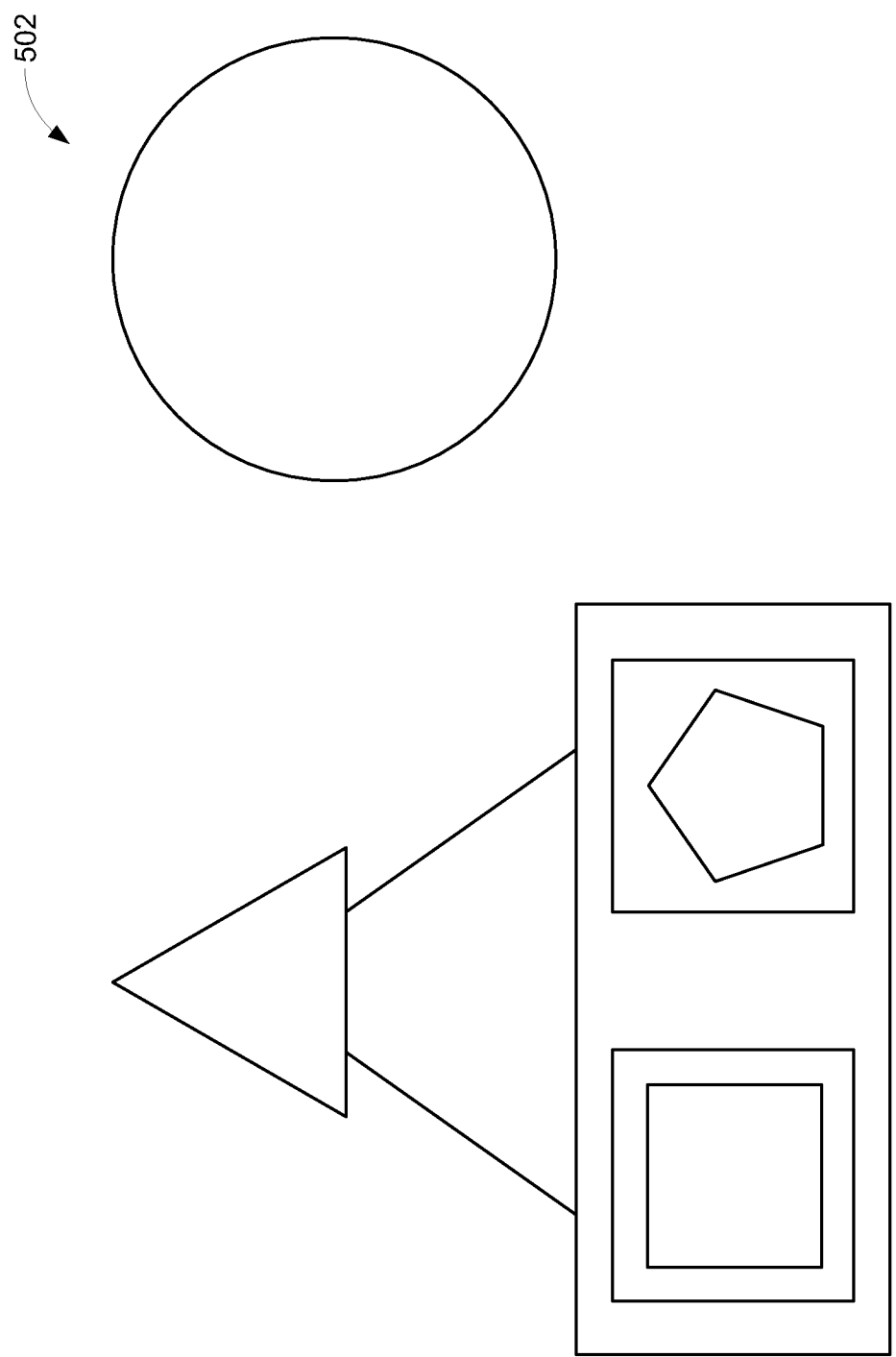

```
~/D/c/autoprovision >>> python3 main.py --image ./images/demo.jpg
How many networks would you like to create? 1
How many subnets would you like to create? 2
How many instances would you like to create? 2
How many load balancers would you like to create? 1
How many load balancers connections would you like to create (i.e. lines)? 2
How many Autonomous Databases would you like to create? 1
```
— 602

Fig. 6

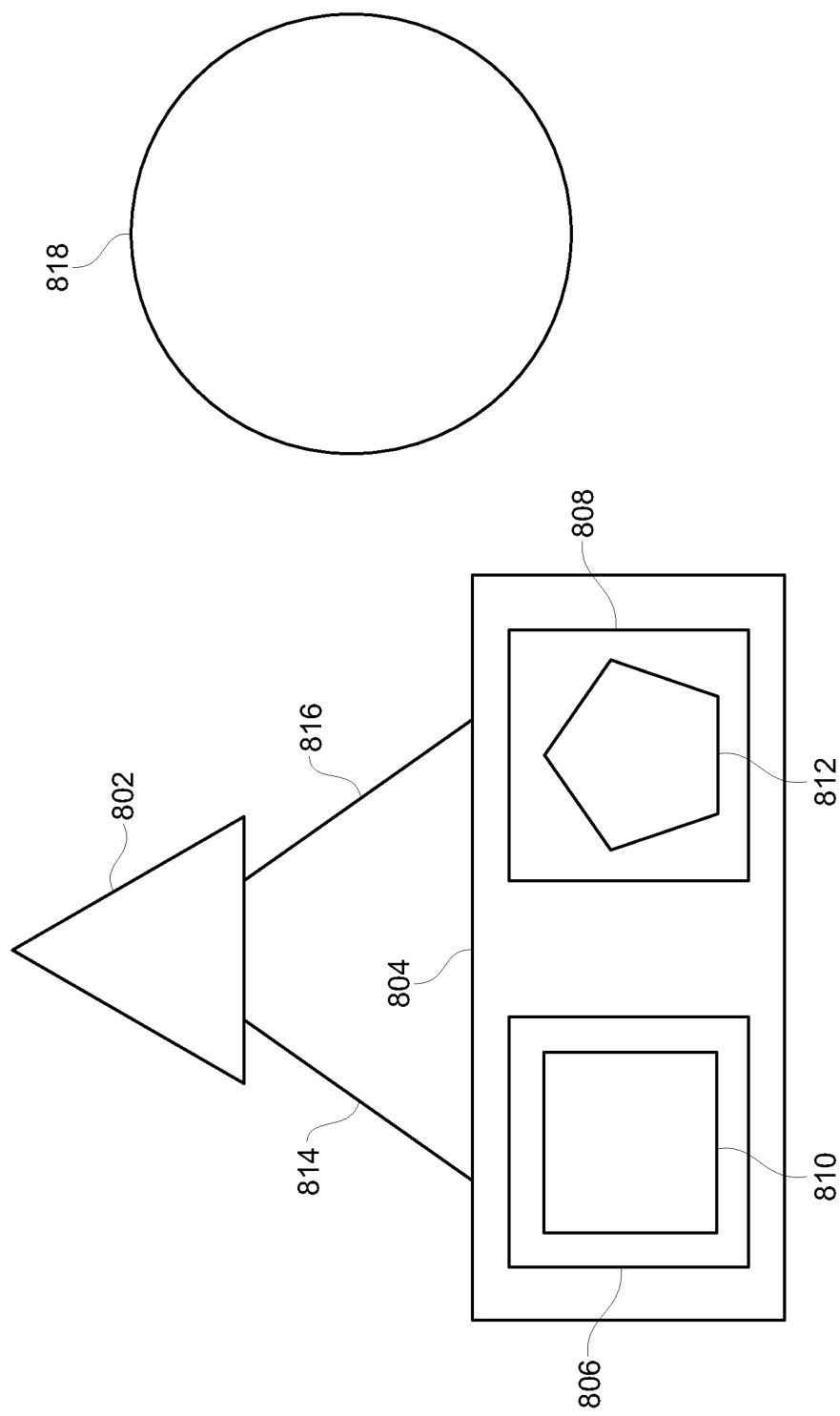

```
Success! Counts: [1, 2, 2, 1, 2, 1]
{'adbs': [{'countourIndex': 12, 'dbname': 'adb0', 'display_name': 'adb0'}],
 'connections': [[8, 14], [4, 14]],
 'lbs': [{'conns': [[4, 'instance0', 'subnet0'], [8, 'instance1', 'subnet1']],
          'contourIndex': 14,
          'lbname': 'lb0' }],
 'vcns': [{'cidr': '10.0.0.0/16',
```
— 902

Fig. 9A

```
'contourIndex': 0,
'subnets': [{'availability_domain': '${lookup(data.oci_identity_availability_domains.ads.availability_domains[var.availability_domain
                                                                '+ 0], "name")}',
           'cidr': '10.0.0.0/24',
           'contourIndex': 2,
           'instances': [{'availability_domain':
'${lookup(data.oci_identity_availability_domains.ads.availability_domains[var.availability_domain
                                                                '+ 0], "name")}',
                          'contourIndex': 4,
                          'inst_name': 'instance0',
                          'shape': 'rectangle'}],
           'sn_name': 'subnet0'},
          {'availability_domain': '${lookup(data.oci_identity_availability_domains.ads.availability_domains[var.availability_domain
                                                                '+ 1], "name")}',
           'cidr': '10.0.1.0/24',
           'contourIndex': 6,
           'instances': [{'availability_domain': '${lookup(data.oci_identity_availability_domains.ads.availability_domains
[var.availability_domain
                                                                '+ 1], "name")}',
                          'contourIndex': 8,
                          'inst_name': 'instance1',
                          'shape': 'pentagon'}],
           'sn_name': 'subnet1'}],
'vcn_name': 'vcn0'}]
```

| Sort by: | Created Date (Desc) ∧∨ | | |
|---|---|---|---|
| ☐ | instance1 ⌒1004<br>OCID: ...q5atba Show Copy<br>PROVISIONING... | Shape: VM.Standard2.8 | Region: iad<br>Availability Domain: PHsl:US-ASHBURN-AD-2<br>Fault Domain: FAULT-DOMAIN-3 |
| ☐ | instance0 ⌒1006<br>OCID: ...oijx7q Show Copy<br>PROVISIONING... | Shape: VM.Standard2.4 | Region: iad<br>Availability Domain: PHsl:US-ASHBURN-AD-1<br>Fault Domain: FAULT-DOMAIN-1 |

| Instance Information | Tags |

Instance Information

Availability Domain: PHst:US-ASHBURN-AD-1

Fault Domain: FAULT-DOMAIN-1

Region: iad  ← 1104

Shape: VM.Standard2.4  ← 1106

Virtual Cloud Network: vcn0

Maintenance Reboot: --

Primary VNIC Information
1108

Private IP Address: 10.0.0.2

Image: O
OCID: ...t
Launched
Compartn
Launch M

Internal F

Instance Information

Instance Information

Availability Domain: PHsfLUS-ASHBURN-AD-2
Fault Domain: FAULT-DOMAIN-3
Region: iad
Shape: VM.Standard2.8 — 1206
Virtual Cloud Network: vcn0 — 1204
Maintenance Reboot: --

Primary VNIC Information — 1208
Private IP Address: 10.0.1.2 — 1210
Public IP Address: 132.145.167.34

Image: Oracle-Linux-7.6-2019.01.17-0
OCID: ...nw2jtq Show Copy
Launched: Wed, 20 Mar 2019 21:41:05
Compartment: natdsalmonhubtraining
Launch Mode: NATIVE Internal FQDN: instance1... Show Copy
Subnet: subnet1
— 1212

Virtual Cloud Networks *in cv_component component* — 1302

Created Virtual Cloud Network

Sort by: Created Date (Desc) ∧∨

[VCN] vcn0 — 1304  CIDR Block: 10.0.0.0/16  Default Route Table: Default Route Table for vcn0  DNS Domain Name: Vcn0.... Show Copy
OCID: ...54snqq Show Copy
AVAILABLE

[VCN] Proxy_prototype  CIDR Block: 10.0.0.0/16  Default Route Table: Default Route Table for proxy_prototype  DNS Domain Name: pp.... Show Copy
OCID: ...som4fa Show Copy
AVAILABLE

Fig. 13

Subnets *in cv_compartment Compartment*

Created Subnet

Sort by: Created Date (Desc) ⌄

| | subnet1 — 1404 | CIDR Block: — 1408 | Subnet Type: Available | Route — 1412 |
| | OCID: | 10.0.0.0/24 | Domain Specific | Table: vcn0-rt |
| S | ...bo4ila Show | Virtual Router MAC | Availability Domain: | Security — 1414 |
| | Copy | Address: | PHsl:US-ASHBURN-AD-2 | List: vcn0-sl |
| AVAILABLE | | 00:00:17:21:BA:EB | DNS Domain Name: | |
| | | | Subnet1... Show Copy | |
| | | | Subnet Access: | |
| | | | Public Subnet | |

| | subnet0 — 1406 | CIDR Block: — 1410 | Subnet Type: Available | Route — 1416 |
| | OCID: | 10.0.0.0/24 | Domain Specific | Table: vcn0-rt |
| S | ...ldwimq Show | Virtual Router MAC | Availability Domain: | Security — 1418 |
| | Copy | Address: | PHsl:US-ASHBURN-AD-1 | List: vcn0-sl |
| AVAILABLE | | 00:00:17:21:BA:EB | | |

Fig. 14

PROVISIONING USING COMPUTER VISION

FIELD

The embodiments of the present disclosure generally relate to provisioning computing resources using computer vision.

BACKGROUND

The computing services implemented by modern service providers are often asked to be robust, flexible, and highly available. For example, modern demands on computing often arise from an opportunity cost associated with inefficient or unavailable computing resources. Some settings allow for on-demand provisioning of computing resources, such as cloud-based service providers, however this provisioning often involves a multi-step process, manual efforts, and other inconveniences. Given the stringent demands on modern computing, a tool that efficiently and quickly provides available computing resources would benefit users of the tool.

SUMMARY

The embodiments of the present disclosure are generally directed to systems and methods for provisioning computing resources using computer vision. An image comprising a plurality of visual elements can be received. The visual elements within the image can be recognized as objects that represent network elements, where the recognized objects represent network elements of a network element type and the network element types comprise one or more of a database, a load balancer, a sub-network, or a virtual machine instance, and an arrangement of the recognized objects that represents a network architecture is recognized. Computing resources can be caused to be provisioned corresponding to the recognized objects by provisioning network elements that comprise one or more of the network element types, wherein the provisioning comprises generating a network architecture for the provisioned network elements based on the recognized arrangement.

Features and advantages of the embodiments are set forth in the description which follows, or will be apparent from the description, or may be learned by practice of the disclosure.

BRIEF DESCRIPTION OF THE DRAWINGS

Further embodiments, details, advantages, and modifications will become apparent from the following detailed description of the preferred embodiments, which is to be taken in conjunction with the accompanying drawings.

FIG. 5 illustrates an image of a computing architecture according to an example embodiment.

FIG. 6 illustrates input for a computing architecture according to an example embodiment.

FIG. 8 illustrates objects recognized in an image of a computing architecture according to an example embodiment.

FIGS. 9A-9B illustrate a configuration file for provisioning a computing architecture according to an example embodiment.

FIGS. 10-16 illustrate user interfaces that relate to provisioning a computing architecture according to an example embodiment.

DETAILED DESCRIPTION

Embodiments provision computing resources using computer vision. For example, an image can be received that includes a diagram of computer architecture. The diagram can include visual elements that represent network computing elements, such as virtual machines, load balancers, databases, sub-networks, and any other suitable computing element. For example, a number of contours can be detected for the visual elements within the received image and objects can be recognized based on the detected number of contours.

In some embodiments, an arrangement for the visual elements can also be detected, where the arrangement represents the architecture for the computing resources. Based on the detected objects and their arrangement, computing resources can be provisioned. For example, one or more virtual machines, load balancers, databases, sub-networks, and any other suitable computing elements can be provisioned.

In some embodiments, one or more generated configuration files can be used to provision the computing resources. For example, the configuration files can be generated based on the detected objects and their arrangements. In some embodiments, a provisioning tool can be configured to provision computing resources according to the one or more generated configuration files. For example, the detected arrangement can be used to generate the configuration files such that a network architecture based on the detected arrangement is defined by the configuration files. Based on these definitions, the subsequently provisioned computing resources can be organized according to the network architecture.

Reference will now be made in detail to the embodiments of the present disclosure, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, and circuits have not been described in detail so as not to unnecessarily obscure aspects of the embodiments. Wherever possible, like reference numbers will be used for like elements.

Figure 1:
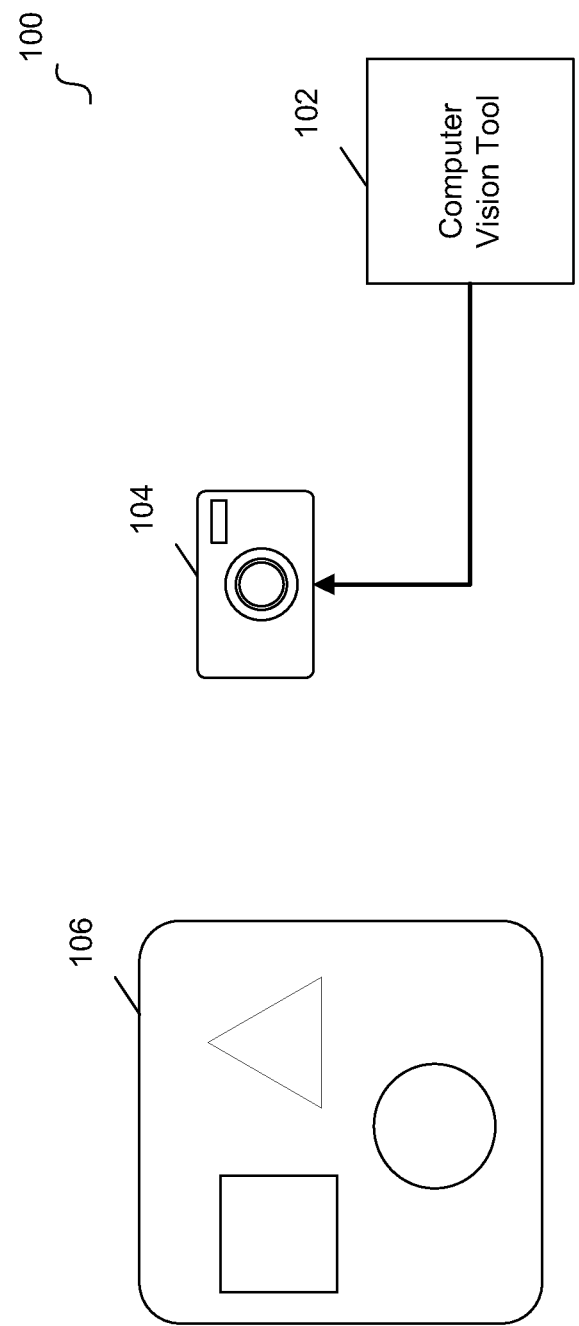
FIG. 1 illustrates a system for provisioning computing resources using computer vision according to an example embodiment.

FIG. 1 illustrates a system for provisioning computing resources using computer vision according to an example embodiment. System 100 includes computer vision tool 102, image capturing device 104, and diagram 106. In some embodiments, diagram 106 can represent a network architecture. For example, a predetermined correspondence between visual elements and network computing elements can be defined, and diagram 106 can include an arrangement of these visual elements. In some embodiments, the arrangement of these visual elements can represent the network architecture for the network elements represented in diagram 106.

In some embodiments, image capturing device 104 can be used to capture an image of diagram 106. For example, diagram 106 can be depicted on a surface, such as a white board, physical sheet of paper, chalkboard, display, or any other suitable surface. In some embodiments, the diagram 106 can be generated as part of a brainstorming session, meeting, or any other discussion (e.g., preliminary discussion or planning discussion). For example, members of a team can discuss computing requirements for a project, service, product, or other implementation, and diagram 106 can be generated (e.g., hand drawn) by the team based on the discussion. Image capturing device 104 can then be used to capture an image of diagram 106. Other embodiments can include other techniques for generating diagram 106 and/or capturing an image of diagram 106.

In some embodiments, the captured image can be received by computer vision tool 102. For example, image capturing device 104 can provide the image to computer vision tool 102 (e.g., transmit the image to a computing device that implements computer vision tool 102). Embodiments include any other suitable techniques for receiving an image of a computer network architecture. Computer vision tool 102 can process the image and recognize objects within the image. For example, the image can be transformed using one or more filters or transformations, and objects can be recognized by computer vision tool 102 based on the processed image. In some embodiments, the recognized objects can be the visual elements within diagram 106, such as the visual elements that include a predetermined correspondence with network computing elements. An arrangement for the objects can also be recognized, where the arrangement represent a network architecture for the network computing elements. Embodiments implement object detection and/or object recognition functionality and algorithms, and these terms will be used interchangeably throughout the disclosure.

In some embodiments, network computing elements corresponding to the detected/recognized objects can be provisioned. For example, computer vision tool 102 can cause a provisioning of these network computing elements. In some embodiments, one or more configuration files can be generated by computer vision tool 102, where the configuration files are used to provision the network computing elements. For example, a provisioning tool can be configured to provision computing resources according to the generated configuration files. In some embodiments, provisioned computing resources can be part of a cloud computing environment and the provisioning tool can provision the network computing elements in the cloud. For example, the network computing elements can include one or more of a virtual machine, a sub-network, a load balancer, a database, and the like.

In some embodiments, the configuration files that are generated can be based on the detected arrangement for the detected objects in the processed image. For example, an arrangement of the detected objects can represent a load balancer that balances load between two sub-networks. In some embodiments, the configuration files that are generated can be configured such that the provisioned computing elements include the relationship represented by the detected arrangement (e.g., the load balancer provisioned according to the configuration file is configured to balance load between the two sub-networks).

Embodiments provide a number of advantages over traditional computing resource provisioning techniques. Traditional computing resource provisioning tools often require cumbersome requirements definitions, such as explicitly defining computing resource shape, instances of virtual machines or databases, the relationship amongst network elements, such as load balancers, among other requirements. For example, often a user is required to navigate numerous user interface pages to input all the required information. Other times, the user is required to generate a data file that includes the information.

Embodiments of the disclosure provide improved speed to availability and efficiency by reducing the effort on the user and the complexity of the requirements definitions. For example, the predetermined correspondence between visual elements and network elements enables the use of simple diagrams to define computing resource requirements. In many instances, simple diagramming is part of a flow that is separate from provisioning, such as a business flow (or other technical flow) for determining how a service or product will be implemented. Embodiments can reuse these simple diagrams for provisioning, thus reducing the excessive effort associated with the traditional techniques for defining resource requirements.

In addition, the detected arrangement of these visual elements that is performed by some embodiments further reduces the complexity and enhances the speed to availability. For example, embodiments enable sophisticated networks of computing resources to be provisioned, such as networks that have a number of sub-networks, connections, and heterogeneous elements. Embodiments of the provisioning computer vision tool provide a robust solution that can improve the overall the provisioning process even for complex computer resource implementations.

The cumbersome nature of traditional provisioning can be particularly troublesome with cloud resources. For example, modern cloud service providers are asked to provide efficient, fast, and flexible techniques for implementing computing resources. This is often the result of the opportunity cost for slow, inefficient, or cumbersome techniques, which can be highly costly to organizations (e.g., costing time, money, brand reputation, amongst others). Accordingly, embodiments that are used to provision cloud resources can be particularly useful given the stringent demands on modern day cloud service providers.

Figure 2:
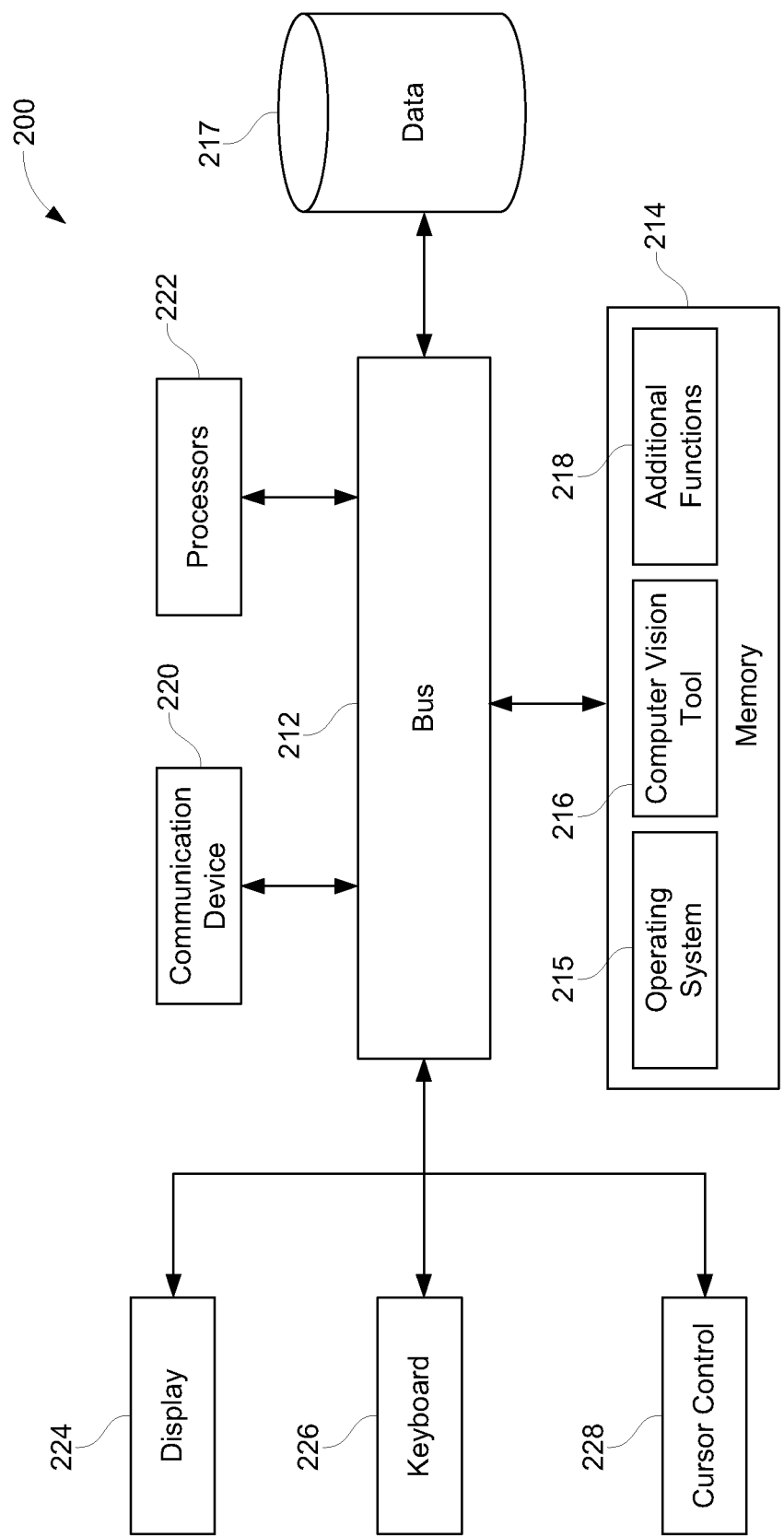
FIG. 2 illustrates a block diagram of a computing device operatively coupled to a system according to an example embodiment.

FIG. 2 is a block diagram of a computer server/system 200 in accordance with embodiments. All or portions of system 200 may be used to implement any of the elements shown in FIG. 1. As shown in FIG. 2, system 200 may include a bus device 212 and/or other communication mechanism(s) configured to communicate information between the various components of system 200, such as processor 222 and memory 214. In addition, communication device 220 may enable connectivity between processor 222 and other devices by encoding data to be sent from processor 222 to another device over a network (not shown) and decoding data received from another system over the network for processor 222.

For example, communication device 220 may include a network interface card that is configured to provide wireless network communications. A variety of wireless communication techniques may be used including infrared, radio, Bluetooth®, Wi-Fi, and/or cellular communications. Alternatively, communication device 220 may be configured to provide wired network connection(s), such as an Ethernet connection.

Processor 222 may include one or more general or specific purpose processors to perform computation and control functions of system 200. Processor 222 may include a single integrated circuit, such as a micro-processing device, or may include multiple integrated circuit devices and/or circuit boards working in cooperation to accomplish the functions of processor 222. In addition, processor 222 may execute computer programs, such as operating system 215, computer vision tool 216, and other applications 218, stored within memory 214.

System 200 may include memory 214 for storing information and instructions for execution by processor 222. Memory 214 may contain various components for retrieving, presenting, modifying, and storing data. For example, memory 214 may store software modules that provide functionality when executed by processor 222. The modules may include an operating system 215 that provides operating system functionality for system 200. The modules can include an operating system 215, a computer vision tool 216 that implements the computer vision and provisioning functionality disclosed herein, as well as other applications modules 218. Operating system 215 provides operating system functionality for system 200. In some instances, computer vision tool 216 may be implemented as an in-memory configuration. In some implementations, when system 200 executes the functionality of computer vision tool 216, it implements a non-conventional specialized computer system that performs the functionality disclosed herein.

Non-transitory memory 214 may include a variety of computer-readable medium that may be accessed by processor 222. For example, memory 214 may include any combination of random access memory ("RAM"), dynamic RAM ("DRAM"), static RAM ("SRAM"), read only memory ("ROM"), flash memory, cache memory, and/or any other type of non-transitory computer-readable medium. Processor 222 is further coupled via bus 212 to a display 224, such as a Liquid Crystal Display ("LCD"). A keyboard 226 and a cursor control device 228, such as a computer mouse, are further coupled to communication device 212 to enable a user to interface with system 200.

In some embodiments, system 200 can be part of a larger system. Therefore, system 200 can include one or more additional functional modules 218 to include the additional functionality. Other applications modules 218 may include various modules of Oracle® Cloud Infrastructure, Oracle® Cloud Platform, Oracle® Cloud Applications, for example. Computer vision tool 216, other applications module 218, and any other suitable component of system 200 can include various modules of Terraform by HashiCorp, OpenCV, other suitable open source tools, or other suitable Oracle® products or services.

A database 217 is coupled to bus 212 to provide centralized storage for modules 216 and 218 and to store, for example, data received by computer vision tool 216 or other data sources. Database 217 can store data in an integrated collection of logically-related records or files. Database 217 can be an operational database, an analytical database, a data warehouse, a distributed database, an end-user database, an external database, a navigational database, an in-memory database, a document-oriented database, a real-time database, a relational database, an object-oriented database, a non-relational database, a NoSQL database, Hadoop® distributed file system ("HFDS"), or any other database known in the art.

Although shown as a single system, the functionality of system 200 may be implemented as a distributed system. For example, memory 214 and processor 222 may be distributed across multiple different computers that collectively represent system 200. In one embodiment, system 200 may be part of a device (e.g., smartphone, tablet, computer, etc.). In an embodiment, system 200 may be separate from the device, and may remotely provide the disclosed functionality for the device. Further, one or more components of system 200 may not be included. For example, for functionality as a user or consumer device, system 200 may be a smartphone or other wireless device that includes a processor, memory, and a display, does not include one or more of the other components shown in FIG. 2, and includes additional components not shown in FIG. 2, such as an antenna, transceiver, or any other suitable wireless device component. Further, when implemented to execute functionality disclosed herein, system 200 is a special purpose computer, specially adapted to provide demand forecasting.

Figure 3:
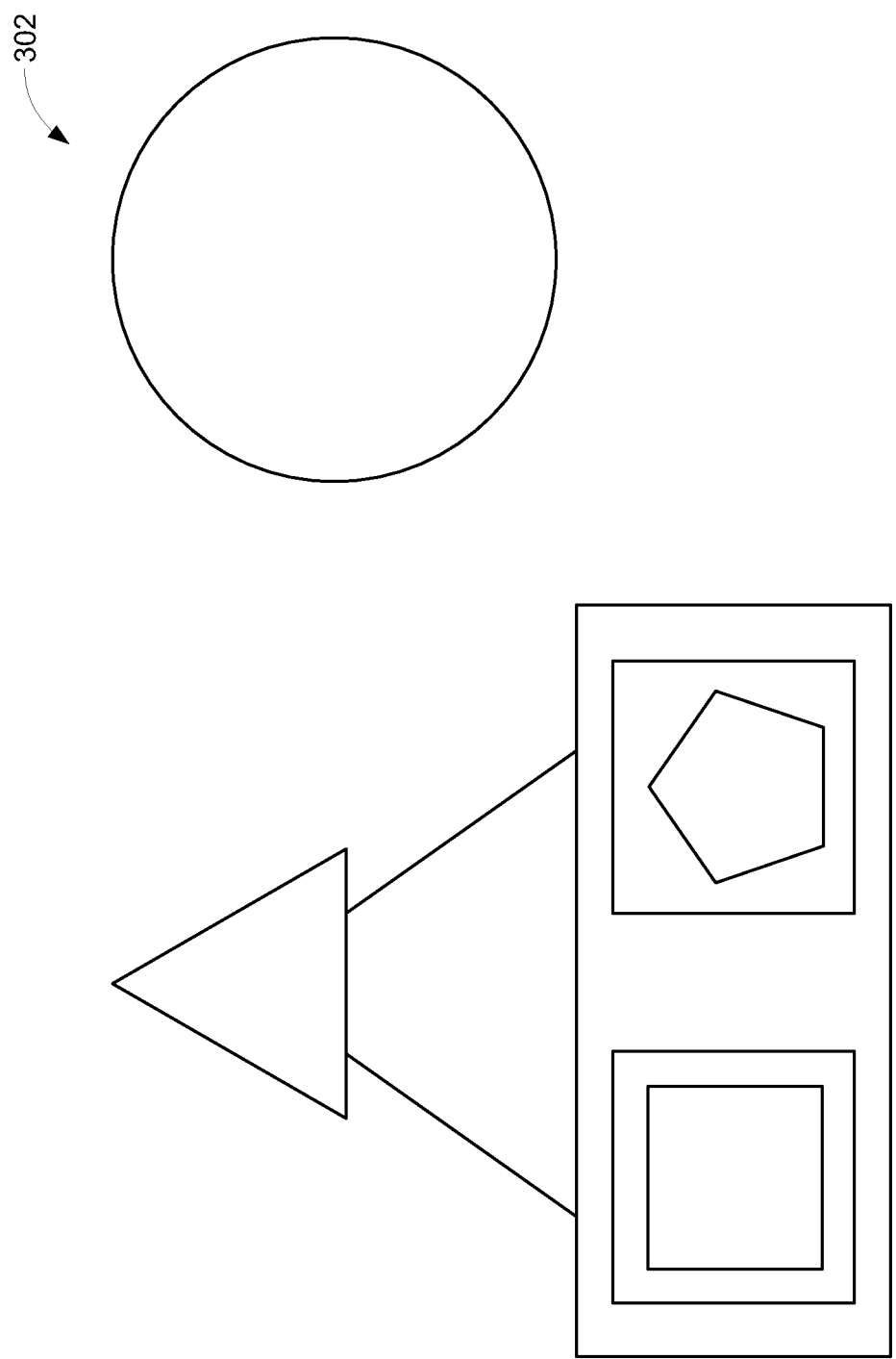
FIG. 3 illustrates a diagram of a computing architecture according to an example embodiment.

Embodiments provision computing resources using computer vision. Referring back to FIG. 1, computer vision tool 102 can receive an image with a diagram that represents network computing elements. FIG. 3 illustrates a diagram of a computing architecture according to an example embodiment. For example, diagram 302 can include visual elements, such as shapes and connections, that represent computing network elements and a computing architecture. For example, diagram 302 can be depicted on a surface, such as a white board, physical sheet of paper, chalkboard, display, or any other suitable surface.

In some embodiments, a predetermined correspondence between visual elements and network computing elements can be defined. For example, the visual elements represented in diagram 302 can include shapes, where different shapes can correspond to different network computing elements. In some embodiments, the visual elements and their arrangement can represent a network architecture.

Figure 4:
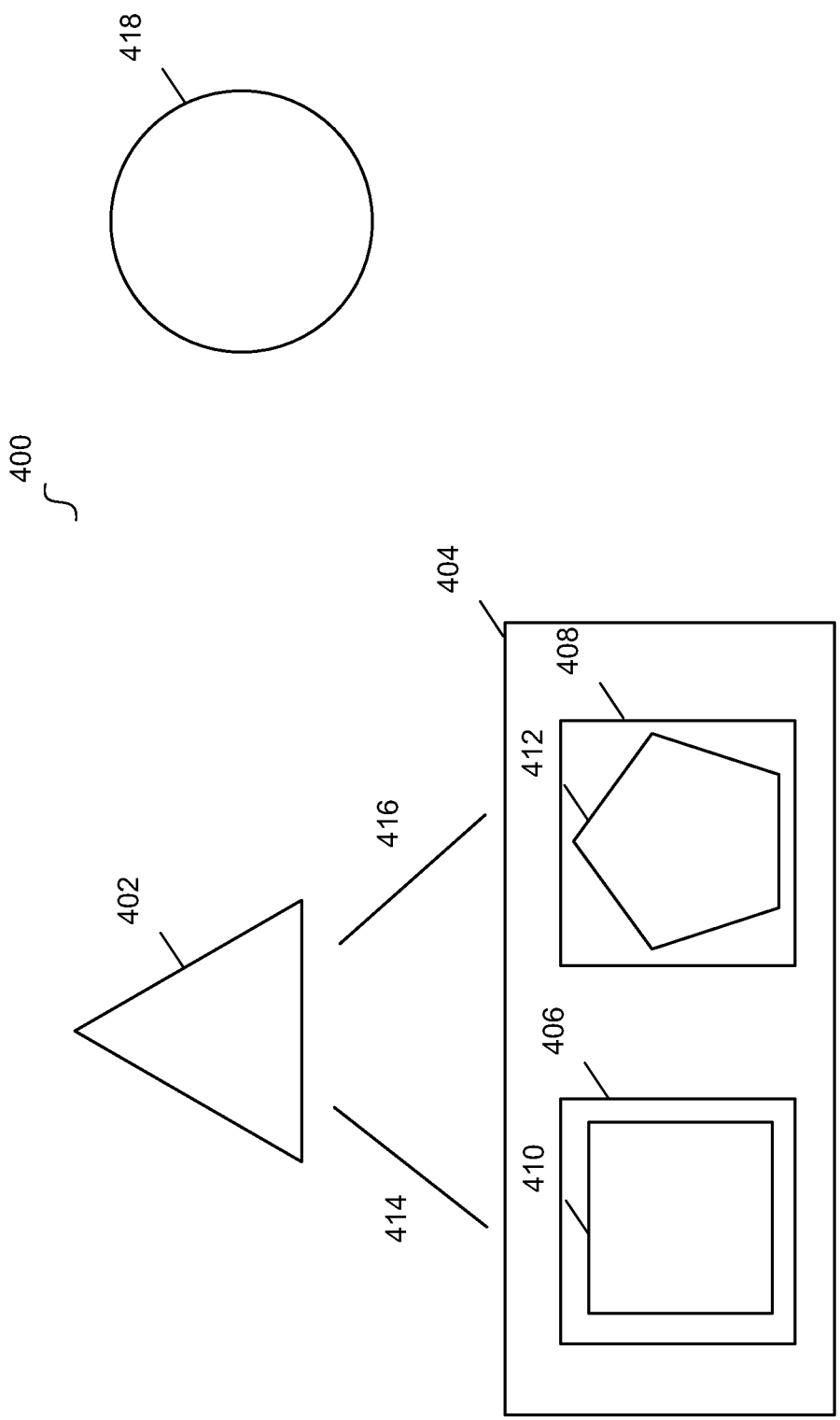
FIG. 4 illustrates another diagram of a computing architecture according to an example embodiment.

FIG. 4 illustrates a computing architecture according to an example embodiment. For example, diagram 302 can depict network architecture 400, which can include load balancer 402, network 404, sub-networks 406 and 408, virtual machines 410 and 412, connections 414 and 416, and database 418. In some embodiments, these network elements are represented by shapes depicted in diagram 302. For example, load balancer 402 can be represented by a triangle, network 404 can be represented by a rectangle, sub-networks 406 and 408 can be represented by rectangles that are contained within another depicted network element (e.g., network 404), virtual machine 410 can be represented by a rectangle that is contained within another depicted network element (e.g., sub-network 406), virtual machine 412 can be represented by a pentagon that is contained within another depicted network element (e.g., sub-network 408), and database 418 can be represented by a circle. In some embodiments, these representations are achieved based on a predetermined correspondence between shapes (and/or an orientation for the shape, such as being contained within another shape) and the particular network element they represent.

In some embodiments, a shape can represent a particular network computing entity, such as a type of database or virtual machine. For example, the circle that represents database 418 can correspond to an autonomous database. Other shapes may represent other types of databases. In addition, the rectangle contained within another visual element can represent virtual machine 410, or a first type of virtual machine, while the pentagon contained within another visual element can represent virtual machine 412, or a second type of virtual machine. In some embodiments, differences in virtual machines can range from the number of CPU cores provisioned to different operating systems running on the virtual machine, depending on how the system is configured. For example, virtual machine 410 can be a VM Standard2.4, while virtual machine 412 can be a VM Standard2.8. In some embodiments, the virtual machine options are determined and/or provided by a cloud vendor. While FIGS. 3 and 4 demonstrate a particular correspondence between shapes and network elements, any other suitable definition/representation can be implemented.

In some embodiments, diagram 302 includes an arrangement of visual elements. For example, the arrangement of visual elements can depict architecture 400. The visual elements can show that load balancer 402 connects to sub-networks 406 and 408 using connections 414 and 416. This depiction can represent that load balancer 402 balances the load between sub-networks 406 and 408. In the illustrated embodiment, sub-network 406 includes virtual machine 410 and sub-network 408 include virtual machine 412. Accordingly, in the illustrated embodiment, load balancer 402 effectively balances load between virtual machine 410 and virtual machine 412.

Referring back to FIG. 1, image capturing device 104 can be used to capture an image of diagram 302. In some embodiments, the captured image can be provided/transmitted to computer vision tool 102. Any other suitable implementation for receiving an image of a diagram at computer vision tool 102 can be used.

FIG. 5 illustrates an image of a computing architecture according to an example embodiment. For example, image 502 can be an image of diagram 302 from FIG. 3, which in turn can represent architecture 400 from FIG. 4. In other words, image 502 can include a diagram that includes visual elements that represent network computing elements and an arrangement of the visual elements that represents a network architecture. In some embodiments, image 502 is received at/transmitted to computer vision tool 102 of FIG. 1.

In some embodiments, computer vision tool 102 can be software the receives an image, recognizes objects in the image, and causes computer resources to be provisioned. For example, computer vision tool can be compiled code (e.g., an executable) or script code that receives image 502 of FIG. 5 as input. In some embodiments, additional information can be received along with image 502. FIG. 6 illustrates input for a computing architecture according to an example embodiment.

In some embodiments, input parameters 602 can include the number of network elements represented in image 502. For example, input parameters 502 can be broken down into network element types (e.g., networks, sub-networks, virtual machine instances, load balancers, connections, databases, and the like). In the illustrated embodiment, input parameters 602 for image 502 are one network, two sub-networks, two virtual machine instances, one load balancer, two connections, and one database. FIG. 6 also depicts computer vision tool 102 as a script (e.g., Python script) that accepts input parameters 602. Computer vision tool 102 can be any other form of software, hardware, or any combination.

In some embodiments, once image 502 and input parameters 602 are received by computer vision tool 102, image 502 is processed. For example, one or more filters or masks can be applied to image 502 to transform the image. In some embodiments, convolution or cross-correlation functions can be used to adjust the pixel values of image 502 to generate a processed image. A plurality of processed images can be generated (e.g., based on a plurality of filters, masks, convolutions, cross-correlations, and other image processing techniques) in some implementations. Some embodiments use one or more open source tools (e.g., OpenCV) or other image processing tools to achieve the image processing.

Figure 7:
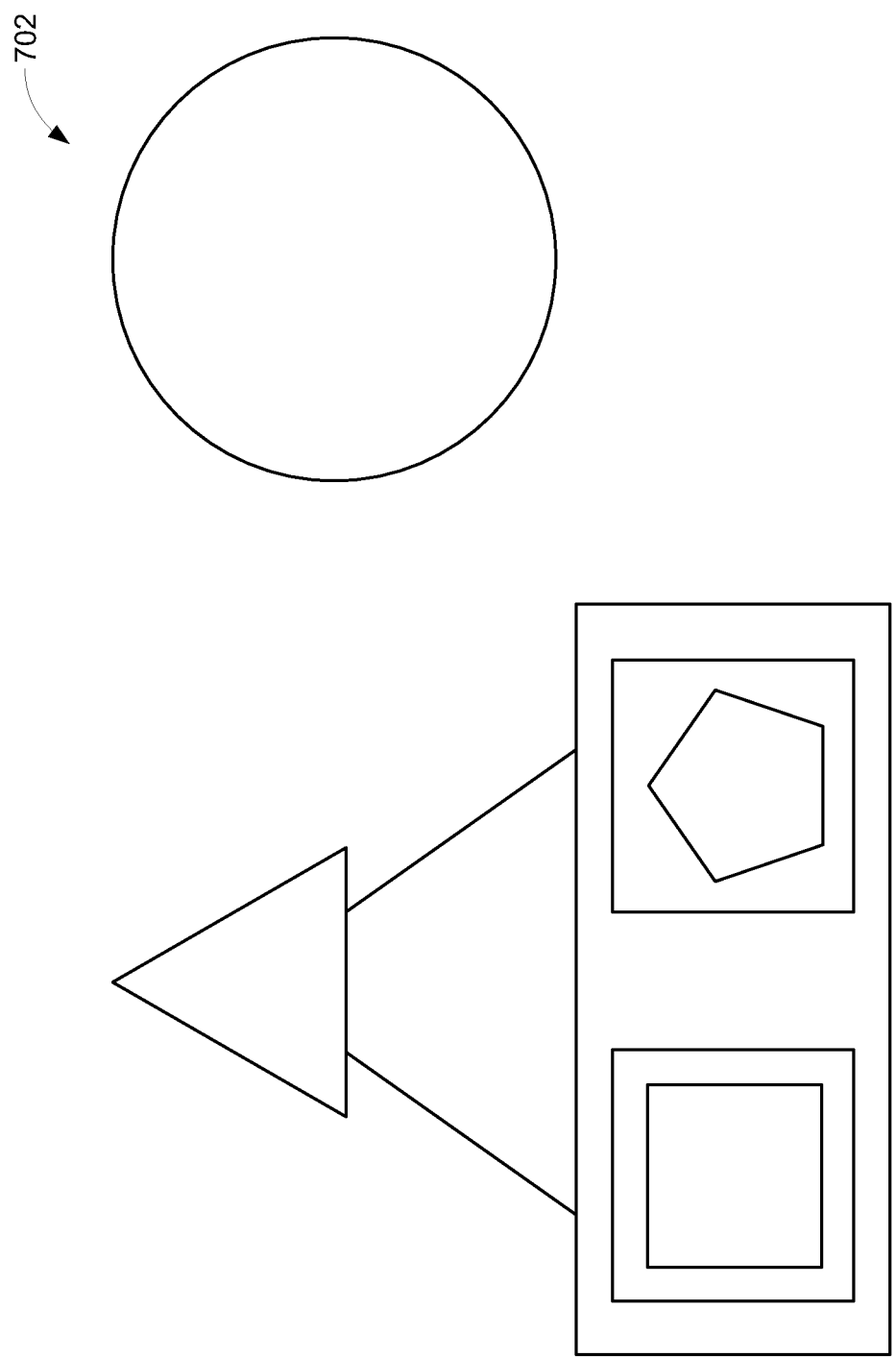
FIG. 7 illustrates a processed image of a computing architecture according to an example embodiment.

FIG. 7 illustrates a processed image of a computing architecture according to an example embodiment. For example, one or more processing techniques can be implemented to generate processed image 702 from image 502. In the illustrated embodiment, the color scheme for image 502 has been changed (e.g., the black and the white in the images has been flipped), and other image quality adjustments have been performed to arrive at processed image 702.

In some embodiments, an image processing algorithm can convert the initial image to black and white, and further cycle through a plurality of image processing parameters to generate processed images, such as the filters, masks, and transformations described herein, or any suitable techniques. For example, for one or more of the processed images, an object recognition algorithm can be used to attempt to detect the expected architecture as provided by the user (e.g., defined by input from the user). If/When the object recognition algorithm detects the expected architecture, the relevant processed image can be deemed correctly processed via the current set of image processing parameters. If the object recognition algorithm does not detect the expected architecture, the processing parameters can be iteratively modified, the image can be reprocessed with the new configuration, and the object recognition algorithm can be run on the newly processed image. In some embodiments, this iterative technique can repeat until an expected architecture is detected by the object recognition algorithm.

In some embodiments, object recognition is performed on one or more processed images. For example, computer vision tool 102 can perform an object recognition algorithm or function on processed image 702 to detect objects within the image. Some embodiments implement one or more open sources tools (e.g., OpenCV) to perform the object recognition. For example, a shape object recognition algorithm or function (e.g., the findContours function of OpenCV) or any other suitable recognition protocol can be used.

FIG. 8 illustrates objects recognized in an image of a computing architecture according to an example embodiment. For example, FIG. 8 includes triangle 802, rectangle 804, squares 806 and 808, square 810, pentagon 812, lines 814 and 816, and circle 818. In some embodiments, a shape object recognition algorithm or function can be implemented that includes an edge detection algorithm or function for detecting edges of objects followed by an object recognition algorithm or function for recognizing the detected objects. For example, the detected objects illustrated in FIG. 8 are based on the visual elements within diagram 302 of FIG. 3 because the processed image is based on a captured image of the diagram. In the illustrated embodiment, the visual elements in diagram 302 include shapes, and thus an object recognition algorithm that readily identifies and distinguishes shapes can be implemented. For example, the shapes in diagram 302 and the objects illustrated in FIG. 8 can be distinguished based on a number of sides that they have (e.g., zero for a circle, one for a line, three for a triangle, four for squares and rectangles, and five for a pentagon). In addition, a square can be distinguished from a rectangle by comparing the length of the sides of the detected object.

In some embodiments, the object recognition algorithm can detect whether an object is contained within another object by comparing relative locations for the objects. For example, it can be determined that square 806 is within rectangle 804, and that square 810 is within square 806. A similar determination can be made for square 808 and pentagon 812. Accordingly, an object recognition algorithm can use the number of sides for an object as well as whether it is contained in one or more other objects when recognizing/detecting the object.

In some embodiments, relative object locations can be determined based location identifiers for objects. For example, the image can be considered a two-dimensional grid, where a first location identifier value can define a position in a first dimension of the grid (e.g., horizontal) and a second location identifier can define a position in a second dimension of the grid (e.g., vertical). Accordingly, a location within the image can be defined by a coordinate pair (e.g., (x,y)). The location for a given object can be defined using a number of different conventions, such as a center point for the object (e.g., one point definition), vertices for the object (e.g., multiple point definition), or other suitable definitions. Embodiments of the object recognition algorithm can also detect the location of the detected objects, for example using one of these conventions. In some embodiments, the area within an object can be readily determined, such as when vertices points are used to define a location for the object (or when some other multi-point definition that indicates area is used). Given multiple detected objects and their locations, the object recognition algorithm can determine whether one object overlaps or contains another object.

In some embodiments, the object recognition algorithm or function can use object definitions to detect/recognize objects. For example, a number of sides can be used in the definition, such as a triangular object being defined as a load balancer object and a circular object being defined as a database object. In some embodiments, the object definitions can also include whether the object is within another object. For example, it can be defined that a rectangular object that is not contained in another object is a network. In addition, it can be defined that a square shaped object that is within a rectangular object (or an object recognized as a network) is a sub-network. It can be defined that a square shaped object or pentagon shaped object that is within a square object (or an object recognized as a sub-network) is a virtual machine instance. In another example, it can be defined that a square shaped object or pentagon shaped object that is within two objects (e.g., a network and subnetwork) is a virtual machine instance. These are merely example object definitions, and other suitable definitions can be implemented.

In some embodiments, a similar algorithm can be used to detect an arrangement of the detected objects. For example, a one-sided object (e.g., a line) can be defined as a connection between objects. In some embodiments, once the objects are recognized and a location is known for each object, the locations can be analyzed to determine the relative locations of the objects, and to determine whether any objects are contained within another object (or within multiple objects).

In some embodiments, a hierarchy can be determined that indicates an arrangement for the recognized objects. For example, consider two squares, square A and square B, where square B is inside square A. For square A, it can be determined that it does not have a parent since it is the outermost shape. In this case, square A can be given an index of 0 since it is the outermost shape and it's parent's index can be −1. It can then be determined that square B does have a parent (e.g., square A—at index 0), and that its parent does not have a parent (e.g., parent's parent's index is −1). This can be used to determine that square B is a child of square A and is nested just one level deep. Accordingly, a hierarchy can be generated that indicates the nesting level of an object as well as its parent(s).

In some embodiments, the input received from the user that defines the network architecture elements discussed with reference to FIG. 6 can be used to configure the object recognition algorithm. For example, the system can be notified that it should detect a compute instance, and the system can be further configured to know that such a compute instance would be located in a subnet and that the subnet would be located in a network. Accordingly, it can be known that an object nested at level two (within an object that is a network and an object that is a subnet) is expected to be recognized. In some embodiments, the detected arrangement of objects can be based on the detected hierarchy of objects.

Embodiments also include detection/recognition of a connection object, such as a line. In some embodiments, lines may be expected to have two endpoints (e.g., not intersect with other lines). Lines may be used to connect various other objects, such as a line representing a load balancer connection. In some embodiments, a line can be linked to network elements (e.g., can connect a load balancer and virtual machines/subnets that are to receive traffic from the load balancer) based on proximity to the line's endpoints.

Similar to the recognition of a hierarchy of objects, the input received from the user that defines the network architecture elements can be used to configure the recognition of lines. For example, if the input defines that there should be two load balancer connections (e.g., the load balancer is directing traffic to two different VMs), the object detection/recognition can be configured to look for a processed image that contains two lines that have endpoints: 1) near (e.g., in close proximity to) a load balancer object (e.g., an outer layer triangle) and 2) near (e.g., in close proximity to) two different compute instance objects (e.g., two different nested squares). Similar to other object detection/recognition functionality, such as the determination of the hierarchy, the relative locations of objects can be used to detect which objects are proximate to the line's endpoints. In some embodiments, libraries from an open source tool (e.g., OpenCV) can be used to perform one or more of these functions. For example, findCountours( ) from OpenCV can be used to return a hierarchy matrix based on detected shapes.

In some embodiments, based on these object definitions (e.g., defined as number of sides and, optionally, whether the object is contained in another object), the objects recognized in FIG. 8 can each be associated with network elements. For example, triangle 802 can be associated with a load balancer, rectangle 804 can be associated with a network, and circle 818 can be associated with a database. In addition, squares 806 and 808 can be associated with sub-networks (e.g., being located within rectangle 804, associated with a network). Squares 810 and pentagon 812 can be associated with virtual machines instances (e.g., being located within squares 806 and 808, associated with sub-networks, and rectangle 804, associated with a network). In addition, lines 814 and 816 can be recognized as connections between the load balancer represented by triangle 802 and the sub-networks represented by squares 806 and 808.

In some embodiments, the object recognition is performed based on the input parameters received with the image. For example, the object recognition can be validated against the input parameters discussed with references to FIG. 6. In some embodiments, the number of recognized objects associated with each network element type is validated against the number of each network element types defined in the input. For example, input parameters 602 of FIG. 6 include the number of network elements represented in image 502 of FIG. 5. In the illustrated embodiment, input parameters 602 are one network, two sub-networks, two virtual machine instances, one load balancer, two connections, and one database. The objects recognized in FIG. 8 and their associated network element types can be validated against these numbers to validate that computer vision tool 102 of FIG. 1 has determined an accurate network architecture.

In some embodiments, other object definitions, recognized objects, and arrangements can similarly be implemented. Accordingly, based on the image processing, object definitions, and object recognition functionality, the network elements and network architecture represented in diagram 302 of FIG. 3 and image 502 of FIG. 5 can be detected by computer vision tool 102 of FIG. 1.

In some embodiments, the recognized objects and recognized arrangement can be used to generate one or more configuration files for provisioning the actual network elements. For example, one or more data files can be generated for the network elements associated with each recognized object. FIGS. 9A-9B illustrate a configuration file for provisioning a computing architecture according to an example embodiment. In some embodiments, data 902 and 904 can be part of a data file (e.g., JavaScript Object Notation ("JSON") file) that holds configuration information about the network elements to be processed and the relationship among them.

For example, data file 902 includes database entry "adbs", labeled adb0, and load balancer entry "lbs", labeled lb0, which shows connections to instance0/subnet0 and instance1/subnet1. Data file 902 also shows the virtual network entry "vcns", which is further detailed by data file 904. For example, the virtual network defined in data file 904 has two subnets, labeled subnet1 and subnet0, each with a virtual machine instance, labeled instance0 and instance1. Data file 904 also lists the shape for instance0 and instance1 as rectangle and pentagon, respectively. Data file 904 shows that the virtual network is labeled vcn0.

Embodiments provide this configuration data file to a provisioning tool that provisions the network architecture defined in the file. For example, Terraform by HashiCorp can be used to provision computing resources in a cloud infrastructure (e.g., Oracle® Cloud Infrastructure). Terraform, which has at times been referred to as "infrastructure as code", is able to read in an appropriately-formatted file (e.g., formatted according to JSON or Hashicorp's proprietary language, Hashicorp Configuration Language ("HCL")) and provision infrastructure based on the definitions within the file. For example, an execution plan can be generated that describes what functions will be performed to provision the computing resources defined in the configuration file, and then this plan can be executed to build the described infrastructure. In some embodiments, a graph of computing resources can be built, and provisioning of non-dependent resources can be performed in parallel. Embodiments can also include Terraform Provisioners, which can run a set of scripts and/or commands to provision infrastructure. Accordingly, a configuration data file can be used to launch of set of process, scripts, and/or commands (e.g., using Terraform) to provision the computing resources defined in the configuration file. Any other suitable provisioning products, services, or functionality can similarly be implemented.

FIGS. 10-16 illustrate user interfaces that relate to provisioning a computing architecture according to an example embodiment. For example, FIG. 10 depicts user interface 1002, which lists virtual machine instance 1004 and 1006 as provisioning. FIG. 11 further depicts information about virtual machine instance 1006, such as shape 1204, virtual cloud network 1206, and private IP address 1208.

FIG. 12 further depicts information about virtual machine instance 1004, such as shape 1204, virtual cloud network 1206, and private IP address 1208. FIG. 12 also depicts public IP address 1210 and subnet 1212 for virtual machine instance 1004, and user interface 1102 can include similar information about virtual machine instance 1006.

User interface 1302 of FIG. 13 depicts the provisioned and available virtual network 1304. User interface 1402 of FIG. 14 depicts the provisioned and available subnets within virtual network 1304, such as subnets 1404 and 1406. In addition, FIG. 14 depicts Classless Inter-Domain Routing blocks for the subnets, CIDR 1408 and 1410. Certain default settings can also be used to provision the computing resources. For example, default settings can be used to provision route tables 1412 and 1416 and security lists 1414 and 1418 for the subnets. In some embodiments, an internet gateway can also be created by default, which can provide the provisioned computing resources with connectivity to the Internet. For example, the route table (e.g., route tables 1412 and 1416) can be configured automatically to route traffic (e.g., outgoing traffic) through that internet gateway.

Figure 15:
Figure 16:
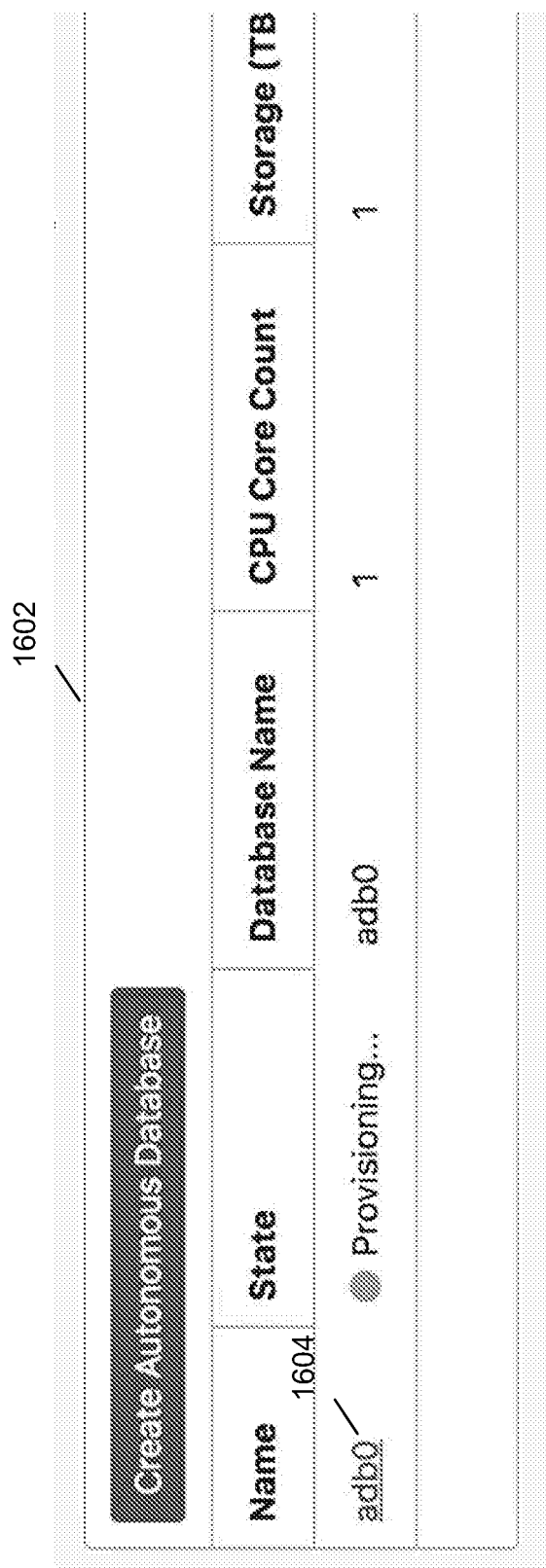

FIG. 15 depicts user interface 1502, which lists a provisioned and active load balancer 1504 and public IP address 1506 for the load balancer. FIG. 16 depicts user interface 1602, which lists a provisioning database 1604. In some embodiments, the network elements may take different durations of time to provision, and once they are provisioned the network architecture can be fully functional and available.

Figure 17:
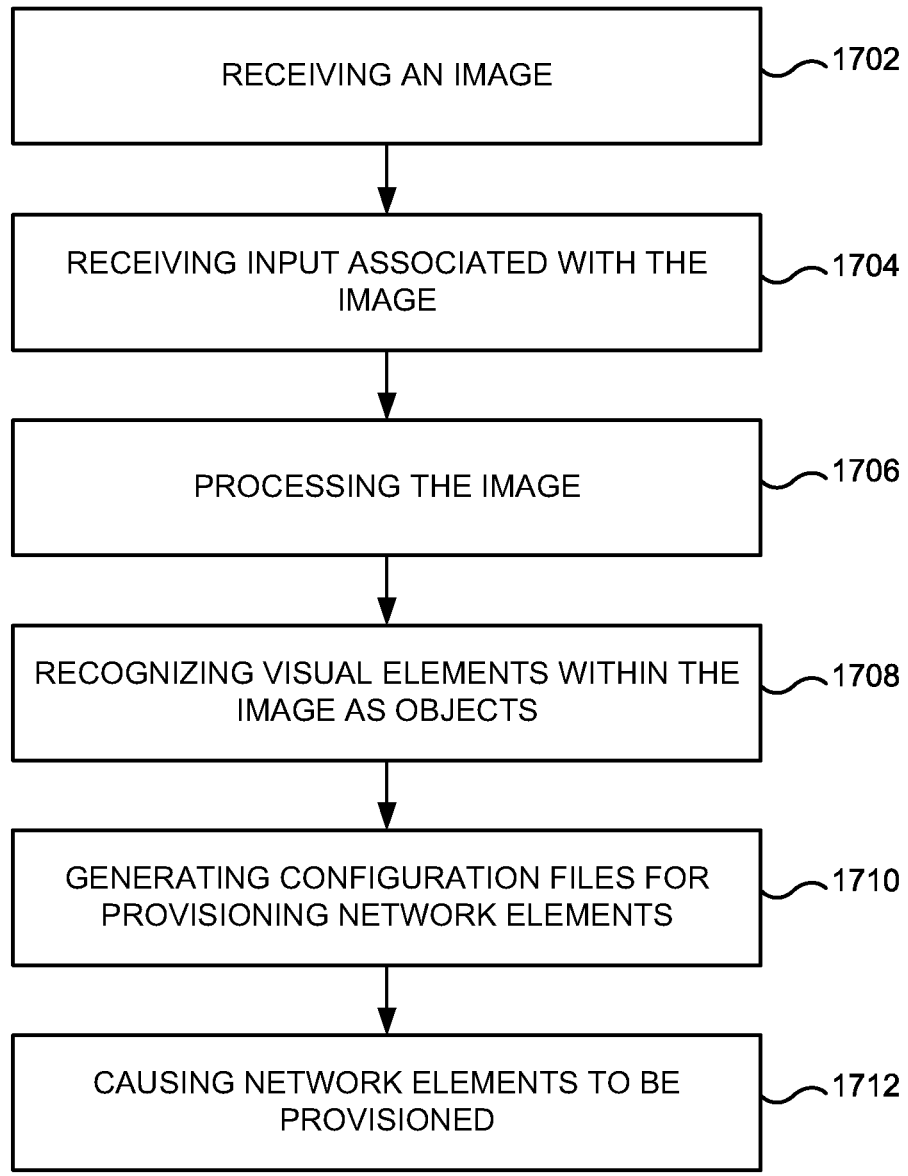
FIG. 17 illustrates a flowchart for provisioning computing resources using computer vision according to an example embodiment.

FIG. 17 illustrates a flowchart for provisioning computing resources using computer vision according to an example embodiment. In some embodiments, the functionality of FIG. 17 is implemented by software stored in memory or other computer-readable or tangible medium, and executed by a processor. In other embodiments, each functionality may be performed by hardware (e.g., through the use of an application specific integrated circuit ("ASIC"), a programmable gate array ("PGA"), a field programmable gate array ("FPGA"), etc.), or any combination of hardware and software. In embodiments, the functionality of FIG. 17 can be performed by one or more elements of system 200 of FIG. 2.

At 1702, an image that includes a plurality of visual elements can be received. For example, an image that includes a diagram of a network architecture can be received. The diagram can include visual elements that represent network elements and an arrangement of the visual elements that represents the network architecture.

At 1704, input associated with the image can be received that includes a number of network elements of network element types. For example, input parameters can be received that correspond to the visual elements/network elements represented in the diagram. In some embodiments, the network elements types can include one or more of a database, a load balancer, a network, a sub-network, and/or a virtual machine instance. The input parameters can include a number of each network element type present in the diagram (e.g., one load balancer, two databases, two virtual machines, and the like).

At 1706, the image can be processed using one or more transformations. For example, one or more image processing techniques can be performed on the image to implement the one or more transformations. In some embodiments, the image processing techniques can adjust the pixel values of the image. The image processing techniques can include masks, filters, convolutions, cross-correlations, and any other suitable image processing technique.

At 1708, based on the processing, the visual elements within the image can be recognized as objects that represent network elements, where the recognized objects represent network elements of the network element types. For example, the objects can be recognized based on a plurality of object definitions and each object definition can be associated with at least one of the network element types.

In some embodiments, the object definitions include at least a number of detected sides. The object definitions can also include shapes, such as one or more of a triangle, a rectangle, a square, a circle, or a pentagon.

In some embodiments, the object recognition is performed based on the input. For example, the object recognition can be validated against the input such that a number of recognized objects associated with each network element type is validated against the number of each network element type defined in the input.

In some embodiments, an arrangement of the recognized objects that represents a network architecture is recognized. For example, a first part of the image can include at least one first visual element that contains at least two second visual elements, and the network architecture for the provisioned network elements based on the first part of the image can include a network containing two sub-networks. In this example, a first recognized object corresponding to the first visual element can be associated with a network, second recognized objects corresponding to the second visual elements can be associated with sub-networks, and a recognized arrangement among the first object and second objects can be associated with a network comprising sub-networks.

In another example, a second part of the image can include at least a third visual element that is visually connected to the second visual elements, and the network architecture for the provisioned network elements based on the second part of the image can include a load balancer that balances load between the two sub-networks. In this example, a third recognized object corresponding to the third visual element can be associated with the load balancer and a recognized arrangement among the third object and second objects can be associated with connections between the load balancer and the two sub-networks.

At 1710, a plurality of network element configuration files can be generated based on the recognized objects, where the configuration files can be used to provision the network elements associated with the recognized objects. For example, the configuration files can be data files that are generate according to a predetermined protocol. In some embodiments, a provisioning tool can be configured to receive the data files and implement the provisioning of the network elements.

In some embodiments, one or more of the network element configuration files are defined based on the recognized arrangement of the recognized objects. For example, relationships among the network elements corresponding to the recognized objects can be represented by the arrangement of the recognized objects, and these relationships can be defined in the generated data files.

At 1712, computing resources can be caused to be provisioned corresponding to the recognized objects by provisioning network elements that include one or more of the network element types. For example, the provisioned network elements can correspond to the recognized objects such that a number of each network element type that is provisioned corresponds to a number of recognized objects associated with each network element type.

In some embodiments, the provisioning includes generating a network architecture for the provisioned network elements based on the recognized arrangement. For example, the recognized arrangement of recognized objects can represent sub-networks within a network, virtual machines within a network or sub-network, connections between a load balancer and networks, sub-networks, virtual machines, or other load balancers, and the like. The provisioning can include provisioning the network elements according to their relationships among one another (e.g., as represented by the recognized arrangement). In some embodiments, provisioning the computing resources includes provisioning the network elements according to the network architecture within a cloud infrastructure.

The features, structures, or characteristics of the disclosure described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present disclosure. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the embodiments as discussed above may be practiced with steps in a different order, and/or with elements in configurations that are different than those which are disclosed. Therefore, although this disclosure considers the outlined embodiments, it would be apparent to those of skill in the art that certain modifications, variations, and alternative constructions would be apparent, while remaining within the spirit and scope of this disclosure. In order to determine the metes and bounds of the disclosure, therefore, reference should be made to the appended claims.

I claim:

1. A method for provisioning computing resources using computer vision, the method comprising:
   receiving an image comprising a plurality of visual elements;
   receiving, at a user interface, input associated with the image comprising a set of network element numbers each associated with a network element type, the network element types comprising one or more of a database, a load balancer, a sub-network, and a virtual machine instance;
   recognizing the visual elements within the image as objects that represent network elements, wherein,
      the objects are recognized as one of the network element types based on a plurality of object definitions, each object definition being associated with at least one of the network element types, the object definitions comprising at least a number of detected sides, at least one object definition comprises a number of sides and a status that the object of the at least one object definition is contained within two detected objects, the set of network element numbers received as input is used to validate numbers of recognized objects of each network element type, and an arrangement of the recognized objects that represents a network architecture is recognized; and causing computing resources to be provisioned corresponding to the recognized objects by provisioning network elements that comprise one or more of the network element types, wherein the provisioning comprises generating a network architecture for the provisioned network elements based on the recognized arrangement.

2. The method of claim 1, wherein the object definitions comprise one or more of a triangle, a rectangle, a square, a circle, or a pentagon.

3. The method of claim 1, wherein the provisioned network elements correspond to the recognized objects such that a number of each network element type that is provisioned corresponds to a number of recognized objects associated with each network element type.

4. The method of claim 3, wherein a first part of the image comprises at least one first visual element that contains at least two second visual elements and the network architecture for the provisioned network elements based on the first part of the image comprises a network containing two sub-networks.

5. The method of claim 4, wherein a first recognized object corresponding to the first visual element is associated with a network, second recognized objects corresponding to the second visual elements are associated with sub-networks, and a recognized arrangement among the first object and second objects is associated with a network comprising sub-networks.

6. The method of claim 5, wherein a second part of the image comprises at least a third visual element that is visually connected to the second visual elements, and the network architecture for the provisioned network elements based on the second part of the image comprises a load balancer that balances load between the two sub-networks.

7. The method of claim 6, wherein a third object is recognized corresponding to the third visual element is associated with a load balancer, and a recognized arrangement among the third object and second objects is associated with connections between the load balancer and the two sub-networks.

8. The method of claim 1, wherein provisioning the computing resources comprises provisioning the network elements according to the network architecture within a cloud infrastructure.

9. The method of claim 8, further comprising:
generating a plurality of network element configuration files based on the recognized objects, wherein the configuration files are used to provision the network elements associated with the recognized objects, and one or more of the network element configuration files are defined based on the recognized arrangement of the recognized objects.

10. The method of claim 1, further comprising:
processing the image using one or more transformations, wherein the object recognition is performed based on the processed image.

11. The method of claim 1, wherein the set of network element numbers is received as input prior to the object recognition.

12. The method of claim 11, wherein a first object definition comprises a first number of sides and a status that the object of the first object definition is contained within one detected object, and a second object definition comprises the first number of sides and a status that the object of the second object definition is contained within two detected objects, the first object definition and the second object definition being associated with different network element types.

13. The method of claim 11, wherein the set of network element numbers received as input indicates an expected hierarchy for the visual elements in the image, and the objects are recognized using the object definitions based on the expected hierarchy.

14. A system for provisioning computing resources using computer vision, the system comprising:
a processor; and
a memory storing instructions for execution by the processor, the instructions configuring the processor to:
receive an image comprising a plurality of visual elements;
receive, at a user interface, input associated with the image comprising a set of network element numbers each associated with a network element type, the network element types comprising one or more of a database, a load balancer, a sub-network, and a virtual machine instance;
recognize the visual elements within the image as objects that represent network elements, wherein,
the objects are recognized as one of the network element types based on a plurality of object definitions, each object definition being associated with at least one of the network element types, the object definitions comprising at least a number of detected sides,
at least one object definition comprises a number of sides and a status that the object of the at least one object definition is contained within two detected objects,
the set of network element numbers received as input is used to validate numbers of recognized objects of each network element type, and
an arrangement of the recognized objects that represents a network architecture is recognized; and
cause computing resources to be provisioned corresponding to the recognized objects by provisioning network elements that comprise one or more of the network element types, wherein the provisioning comprises generating a network architecture for the provisioned network elements based on the recognized arrangement.

15. The system of claim 14, wherein the instructions configure the processor to:
generate a plurality of network element configuration files based on the recognized objects, wherein the configuration files are used to provision the network elements associated with the recognized objects, and one or more of the network element configuration files are defined based on the recognized arrangement of the recognized objects.

16. The system of claim 14, wherein the set of network element numbers is received as input prior to the object recognition.

17. The system of claim 16, wherein a first object definition comprises a first number of sides and a status that the object of the first object definition is contained within one detected object, and a second object definition comprises the first number of sides and a status that the object of the second object definition is contained within two detected objects, the first object definition and the second object definition being associated with different network element types.

18. The system of claim 16, wherein the set of network element numbers received as input indicates an expected hierarchy for the visual elements in the image, and the objects are recognized using the object definitions based on the expected hierarchy.

19. A non-transitory computer readable medium having instructions stored thereon that, when executed by a processor, cause the processor to provision computing resources using computer vision, wherein, when executed, the instructions cause the processor to:

receive an image comprising a plurality of visual elements;

receive, at a user interface, input associated with the image comprising a set of network element numbers each associated with a network element type, the network element types comprising one or more of a database, a load balancer, a sub-network, and a virtual machine instance;

recognize the visual elements within the image as objects that represent network elements, wherein, the objects are recognized as one of the network element types based on a plurality of object definitions, each object definition being associated with at least one of the network element types, the object definitions comprising at least a number of detected sides, at least one object definition comprises a number of sides and a status that the object of the at least one object definition is contained within two detected objects, the set of network element numbers received as input is used to validate numbers of recognized objects of each network element type, and an arrangement of the recognized objects that represents a network architecture is recognized; and cause computing resources to be provisioned corresponding to the recognized objects by provisioning network elements that comprise one or more of the network element types, wherein the provisioning comprises generating a network architecture for the provisioned network elements based on the recognized arrangement.

\* \* \* \* \*